United States Patent [19]
Panzer et al.

[11] 3,894,946
[45] July 15, 1975

[54] PROCESS FOR TREATING INDUSTRIAL WASTES

[75] Inventors: Hans Peter Panzer, Stamford, Conn.; Kenneth Wayne Dixon, Ypsilanti, Mich.

[73] Assignee: American Cyanamid Company, Stamford, Conn.

[22] Filed: Feb. 25, 1974

[21] Appl. No.: 445,399

Related U.S. Application Data

[60] Continuation-in-part of Ser. No. 347,274, April 2, 1973, abandoned, which is a division of Ser. No. 233,622, Feb. 4, 1972, Pat. No. 3,738,945, which is a continuation-in-part of Ser. No. 115,556, Feb. 16, 1971, abandoned.

[52] U.S. Cl. .................................................. 210/54
[51] Int. Cl.² ........................................... C02B 1/20
[58] Field of Search ............. 210/10, 43, 47, 52–54; 260/89.7 N

[56] References Cited
UNITED STATES PATENTS

| | | | |
|---|---|---|---|
| 2,173,069 | 9/1939 | Ulrich et al. | 260/247 |
| 2,753,372 | 7/1956 | Lundburg | 260/501 |
| 3,131,144 | 4/1964 | Nagan | 210/54 |
| 3,240,721 | 3/1966 | Fordyce | 260/2 |
| 3,259,570 | 7/1966 | Priesing et al. | 210/53 |
| 3,493,502 | 2/1970 | Coscia | 210/54 |
| 3,567,659 | 3/1971 | Nagy | 260/2 |

FOREIGN PATENTS OR APPLICATIONS 1,111,144  7/1961  Germany

*Primary Examiner*—Thomas G. Wyse
*Attorney, Agent, or Firm*—William J. van Loo

[57] ABSTRACT

Treatment of flocculatable industrial wastes with effective amounts of polyquaternary polymers obtained by interaction of secondary amine, a difunctional epoxy compound, and a polyfunctional amine provides improved processing of the wastes when the solution viscosity of the polyquaternary polymer is at least 100 centistokes when measured at 25°C. at a concentration of 37%, by weight, based on the cationic portion of the polyquaternary polymer.

6 Claims, No Drawings

PROCESS FOR TREATING INDUSTRIAL WASTES

This is a continuation-in-part of our copending application Ser. No. 347,274, filed Apr. 2, 1973 and now abandoned, which in turn, is a division of our application Ser. No. 233,622, filed Feb. 4, 1972, and now U.S. Pat. No. 3,738,945 issued June 12, 1973, which is a continuation-in-part of application Ser. No. 115,556, filed Feb. 16, 1971, now abandoned.

This invention relates to a process of flocculating industrial wastes. More particularly, this invention relates to such a process wherein flocculatable industrial wastes are treated with an effective amount of a polyquaternary polymer obtained from reaction of a major portion of secondary amine, a minor portion of polyfunctional amine and an epoxy type reactant whereby the polyquaternary polymer obtained has a solution viscosity at 25°C. of at least 100 centistokes as a 37%, by weight, aqueous solution, based on the cationic portion of the polyquaternary compound.

Industries whose wastes cause difficulties are numerous and are increasing in number and size. The problems in the disposal of industrial waste are increasing to such an extent that special knowledge of the industrial processes is necessary for their solution. In many communities, the industrial waste, both in volume and in population equivalent, exceed the municipal wastes. In most instances, the industries cooperate with municipal authorities to alleviate the waste disposal problems. In some instances, industrial wastes are treated to the major extent necessary by industry while in other instances, the major extent of treatment is carried out by the municipality. Thus, developments in treating industrial wastes may be of interest to industry, to municipalities, or to both.

Various treatments have been developed for dealing with industrial wastes. These treatments can be summarized as follows:
1. Remove sizable suspended solids by screening or settling;
2. Remove fats, oils, and greasy solids by flotation and skimming procedures, aided in some cases by chemical treatment;
3. Remove colloidal solids by flocculation with chemical coagulants and electrolytes, followed by settling and possibly filtration;
4. Neutralize excessive acidity or alkalinity by addition of chemicals;
5. Remove or stabilize dissolved solids by chemical precipitation, or biological processes, or combination of both;
6. Decolorized by chemical treatment with settling or filtration, singly or in combination; and
7. Reoxygenate the wastes by suitable aeration methods. These particular methods of treatment are of varying degrees of success depending upon the specific industrial waste being treated. In most methods, more effective processing would be a significant advance in the art.

The process of the present invention is directed particularly to flocculation of industrial wastes, the treatment dealt with under (3) above. In order to apply flocculation to the treatment of industrial wastes, of course, it is necessary that the waste contain flocculatable solids that are advantageously removed. The flocculatable solids may be initially present in the wastes or may arise as a result of primary treatment of the wastes.

From the standpoint of disposing of industrial wastes therefore, flocculation of aqueous dispersions is an important operation. An aqueous dispersion, as that term is intended to mean a system having two phases, one of which is a continuous outer aqueous phase regardless of whether the disperse phase or phases are suspensions of fine particles or much larger particles. The term is applicable to industrial waste and is inclusive of washes from fermentation processes for producing enzymes and the like, ilmenite digestion liquors, paper-making wastes, clay dispersions, iron ore slimes, laundry wastes, and the like as well as to other industrial wastes which have gone through some primary treatment which gives rise to flocculatable systems.

The physical properties that are responsible for effective performance of various flocculants are not precisely known and, therefore, are not predictable. There is no good correlation between property modifications that result in more effective performance with one flocculant type and those property modifications that result in more effective performance with another flocculant type. Although some physical properties are shared by certain effective flocculants, the effect of variation of individual properties thereof does not appear to have been investigated to any great extent nor do the results of limited investigations lead to any consistent conclusions.

German Auslegeschrift 1,111,144, July 20, 1961, produces a polyquaternary by reacting dimethylamine with epichlorohydrin. The product is obtained by a cold reactant addition stage in a dilute aqueous medium followed by a staged heating procedure and is described as a treating agent for dyed materials or as a dyeing assistant. No suggestion of use as a flocculant is made. The products are of low molecular weight as reflected in viscosity when measured on the Gardner-Holdt scale at 25°C. and at 37% solids, by weight, based on the cationic portion of the polyquaternary compound of 70 centistokes or less. While subsequent evaluation of the product as flocculants has shown some efficiency, the efficiency is considerably less than the polyquaternaries of the present invention and such evaluation was not suggested in the publication cited. The inventors of the German Auslegeschrift apparently were unaware of methods of increasing molecular weight of the polymer and, since the polymers they obtained were satisfactory for the use intended, were content not to go beyond the extent of polymerization actually achieved.

U.S. Pat. No. 2,454,547, Bock et al., Nov. 23, 1948, discloses preparation of polyquaternary compounds by reaction of secondary amines with epichlorohydrin. The compounds obtained are surface active and of such low molecular weight as not to be considered for use as flocculants. The compounds are prepared by use of expensive solvents which use increased product costs and requires additional processing steps for solvent recovery.

U.S. Pat. No. 3,259,570 discloses a polymer prepared from equimolar quantities of epichlorohydrin and dimethylamine and in addition 13% by weight of tetraethylenepentamine. The particular method by which the polymer is obtained is not stated and it can only be presumed to have been made by procedures known in the prior art. Performance of the polymer, as shown in Table 3 of the patent, indicates that it is of low molecular weight.

In accordance with the present invention, there is provided a process for flocculating flocculatable industrial wastes which are in the form of aqueous dispersions having negative charges which process comprises adding to the dispersion an effective amount of a water-dispersible polyquaternary polymer consisting essentially of the reaction product of a lower dialkylamine, a polyfunctional amine, and a difunctional epoxy compound selected from the group consisting of epihalohydrins, diepoxides, precursors of epihalohydrins and diepoxides which under alkaline conditions are readily converted into the corresponding epoxy compounds, and mixtures thereof, said polyquaternary polymer containing repeating units of the structures.

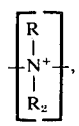

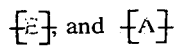

as the cationic portion, and X— as the anionic portion wherein R and $R_2$ are individually selected from the group consisting of alkyls of 1 to 3 carbon atoms; E is a residue obtained from said epoxy compound; A is a residue obtained after at least bifunctional epoxy reaction from a polyfunctional amine selected from the group consisting of ammonia; primary amines; alkylene diamines of 2 to 6 carbon atoms; polyalkylenepolyamines of the structure

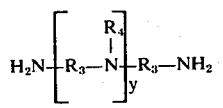

wherein $y$ represents an integer of about 1 to 5, $R_3$ is an alkylene radical of about 2 to 6 carbon atoms, and $R_4$ is selected from the group consisting of hydrogen, alkyl of about 1 to 3 carbon atoms, and ω-aminoalkyl of about 2 to 6 carbon atoms; a polyglycolamine of a structure such as:

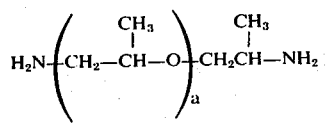

wherein $a$ is an integer of about 1 to 5; piperazine; heteroaromatic diamines of the structure

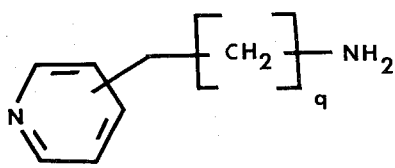

wherein $q$ is zero or an integer of about 1 to 3; and aromatic diamines of the structure

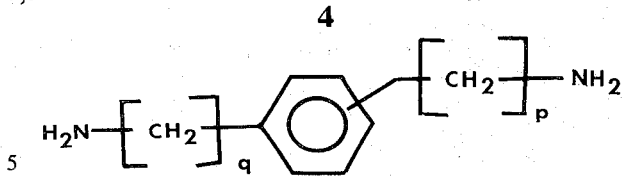

wherein $p$ and $q$ are individually zero or an integer of about 1 to 3; X— is an anion forming the anionic portion of said polyquaternary compound; the amount of said polyfunctional amine being up to about 15 mole percent of the total moles of said dialkylamine and said polyfunctional amine, the amount of said E is from at least that amount which is equimolar to the molar quantities of said amines up to the full functional equivalency of said amines, so as to provide a polyquaternary compound which as a 37% aqueous solution based on the cationic portion of said polyquaternary compound has a viscosity at 25°C. of at least 100 centistokes; and the amount of said ion present is such as to satisfy anion requirements of the cationic portion of said polyquaternary compound.

The present process is outstanding in performance in the flocculation of various flocculatable industrial wastes and has a widely diversified range of utility, highly unexpected with a single type of polymeric compound in view of prior art procedures. The high efficiency of the present process not only enables greater solids removal to be effected but allows desirable removal to be achieved at lower flocculant usages than is conventionally required.

The polyquaternary compounds of the present process, being the result of a polymerization reaction, are not obtained as simple single substances. Instead the products are obtained as a mixture varying in molecular weight as to individual species. Complicating characterization of the polymeric materials is the fact that ionic polyquaternary compounds are involved and characterization is influenced by the anionic portions present. To avoid these various problems, viscosity of aqueous solutions of the polyquaternary compounds is determined at concentrations expressed in terms exclusive of the anionic portion thereof to characterize the polymers and this property is known to correlate well with molecular weight of polymers. Throughout the specification and claims, therefore, the viscosity measurement reported is measured at 25°C. in aqueous medium at 37% polymer solids, by weight, based on the total weight of the cationic portion of the polyquaternary compound, that is to say the polymeric material minus its associated anion.

In preparing the various products of the present invention epoxy type reactants are employed. Epihalohydrins are used and are intended to include epichlorohydrin and epibromohydrin, for example. Longer chain epihalohydrins may also be used. Epichlorohydrin is preferred both from economic and reactivity aspects. Diepoxides, such as 1,4-butanediol-diglycidyl ethers, a preferred diepoxide, are also useful. It is to be noted that epihalohydrins and diepoxides are bifunctional in reaction and this permits formation of essentially linear polymers in appropriate instances. Precursors for epihalohydrins and diepoxides are also useful. For example, 1,3-dichloropropanol-2, a precursor for epichlorohydrin, may be used. Similarly, 1,4-dichloro, 2,3-dihydroxybutane, the precursor for 1,3-butanediepoxide, may also be used. These precursors are readily converted into corresponding epoxy compounds under alkaline conditions and thus are generally employed under alkaline conditions in the present processes. Mixtures of the various epoxy type reactants may also be employed. In forming the principal polymer chain, the amount of epoxy type compound should be substantially equimolar in amount to the total amount of amine usage, viz, the dimethylamine and the polyamine employed. When less than substantially equimolar amounts are used, the molecular weight is decreased.

Controlled addition of reactants in forming the reaction mixture can also be employed as a means of influencing formation of the principal polymer chain. In preferred instances, subsequent to reactions of equimolar amounts of total amine and epoxy type reactants, additional increments of epoxy type reactant are added to react with unreacted functionalities of the polyamines, providing acceptable branching and additional quaternarization, as well as cross-linking of separate molecular chains. If the epoxy type reactant is held below the equimolar amount indicated hereinabove, the reaction is terminated much sooner than is generally desired. The preferred choice of relative amounts of epoxy type reactant and total amine contemplated by means of this invention leads to the formation of high molecular weight linear chains in the polymer backbone, with the desired branch or cross-linking sites. Additional reaction with epoxy type compounds of unreacted amine functionalities also tends to diminish susceptibility of the polyquaternary compound to chlorine attack where present in specific utilities. In this respect, therefore, it is to be understood that usage of epoxy type compounds can be up to the full equivalency of the amine reactants present, which can be much higher than the preferred equimolar quantity.

Secondary amines useful in the processes of the present invention include dimethylamine, preferred, diethylamine, dipropylamines, and secondary amines containing mixtures of alkyl groups having 1 to 3 carbon atoms. Secondary amines of higher carbon atom contents are generally sluggish in reaction due to steric effects of the substituents present therein.

Thus such amines not only require unduly long reaction times but may also interfere with quaternary formation. Mixtures of the amines recited above may also be employed. It is to be noted that secondary amines are bifunctional in reaction with the bifunctional epoxy type reactants, a first function provided by the hydrogen atom and a second function involving quaternarization of the nitrogen atom. Where a secondary amine is the sole amine type employed in backbone preparation, the backbone obtained by use of difunctional epoxy type compound can only be linear in structure at this stage of reaction.

The polyamines contemplated in the preparation of the polyquaternary compounds should constitute at least about 1% but not more than about 15% of the total molar amount of amines in the reaction and more usually about 2% to 8% of the molar amount. Higher amounts lead to excessive chain branching and can adversely effect performance and solubility of the products. The specific content of polyamine that may be used will vary in individual instances depending primarily upon the total functionality of the polyamine considered. Thus, polyamines of very high functionality can generally only be used in smaller amounts while polyamines of low functionality can be used in greater amounts, within the general range specified. For example, a diamine having a functionality of 6 or more with respect to the epoxy type reactant cannot be used in an amount greater than about 8% on a molar basis based on the total molar amount of amines employed, whereas with a functionality of the polyamine less than 6, the amount thereof is greater than about 8 mole percent of the total amine. The upper limit of usage of a polyamine is that amount which still provides a water-soluble product. Referring to ethylenediamine, for example, it should be noted that this amine is hexafunctional with respect to reaction with epoxy type compound, four functionalities provided by the two hydrogen atoms present on each amine group and two additional functionalities involving quaternarization of each of the two nitrogen atoms. Not all of these functionalities are of equal reactivity and, consequently, possibilities for control of the reaction to some extent between chain formation, chain branching, and quaternarization are provided. Amounts of polyamine below about 1 mole percent based on the total molar amount of amines employed generally do not have any significant effect on the properties of the polyquaternary compound and it is generally preferred to have at least 2 mole percent present, same basis.

Ammonia is polyfunctional in its reaction with an epoxy type reactant and may be employed as an equivalent to a polyamine. Primary amines are also useful and include a wide variety of aliphatic and aromatic species. The only requirements as to use of primary amine are that it possess sufficient reactivity with the epoxy type compound to exhibit polyfunctional reaction and that its use not result in water-insolubility of the polyquaternary. Preferred primary amines are lower alkyl amines wherein the alkyl group contains up to about 3 carbon atoms.

Polyamines which may be employed include alkylenediamines alkylene-diamines about 2 to about 6 carbon atoms such as ethylenediamine, propylenediamine, and hexamethylenediamine. Oligomers of alkylene diamines are obtained from still bottoms resulting from the purification of certain alkylenediamines for other industrial purposes, for example in the purification of hexamethylenediamine used extensively for producing various nylons. The still bottoms, although not readily characterized as to exact composition give excellent results in preferred embodiments of the present invention and, since they are by-products, are quite economical. Polyalkylenepolyamines are also useful in the present process and include such compounds as diethylenetriamine, dipropylenetriamine, triethylenetetramine, pentaethylenehexamine, nitrilotris(propylamine), propylenediamine, N-methyl, N-propylamine, nitrilotris(ethylamine) and generally any compound of the following structure:

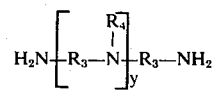

wherein $y$ represents an integer of about 1 to 5, $R_3$ is an alkylene group of about 2 to 6 carbon atoms, and $R_4$ is selected from the group consisting of hydrogen, alkyl of about 1 to 3 carbon atoms, and ω-aminoalkyls of about 2 to 6 carbon atoms. In addition, other useful polyamines include polyglycolamines of a structure such as:

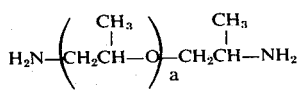

wherein a is an integer of about 1 to 5, heterocyclic aliphatic diamines such as piperazine, heteroaromatic diamines of the structure:

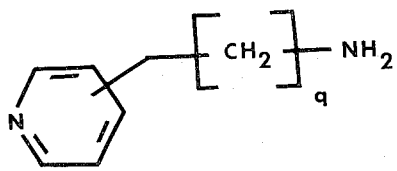

wherein q is 0 or an integer of about 1 to 3, and aromatic diamines of the structure:

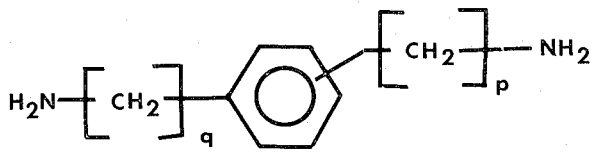

wherein p and q are individually zero or an integer of about 1 to 3.

Polyamine-polybasic acid condensation products are obtained by condensing a polyfunctional amine with a polyfunctional acid using a slight excess of amine so as to provide an amine-terminated product. Such condensates are widely known, as are their preparative methods. Typically, one would condense an amine such as triethylenetetramine with an acid such as adipic acid using a slight excess of amine over an equimolar charge of reactants. The product obtained has the structure:

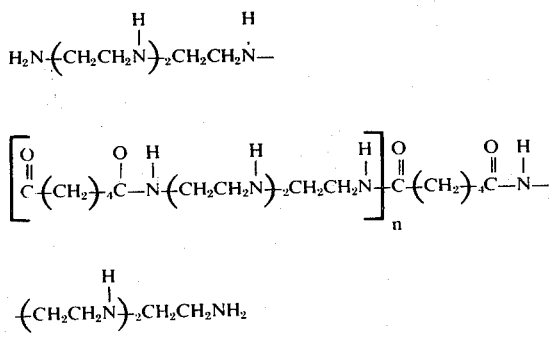

wherein n is an integer such as to indicate a polymer of a molecular weight up to about 10,000. Although the polymer contains amide linkages, it is terminated with amine groups and has additional amine functionality depending upon the number of amine groups in the polyamine employed. Although the condensation product is typified by triethylenetetramine and adipic acid, it is to be understood that other polyamines and polybasic acids, as is well known, may be employed in preparing the condensate.

In carrying out the initial reaction of epoxy type compounds solely with secondary amine, addition of the reactants may be in either order, i.e., the epoxy type compound may be added to the amine or the amine may be added to the epoxy type compound. Water is essential in preparing the reaction mixture and the amount of water present is critical. Generally, the amount of water present will be in the range of about 10% to about 55%, by weight, based on the total weight of reactants and water, and this is true in connection with a reaction mixture in which the plural amines, i.e., the secondary amine and the polyamine are present. Absence of water presents problems in controlling the reaction and some water is necessary to effect reaction. The amount of water present also influences the degree of polymerization effected, as reflected in solution viscosity of the resulting polyquaternary compound, lower amounts of water resulting in polyquaternary compounds of higher solution viscosities at equal solids of the cationic portions of the polyquaternary compound. Thus, the ultimate degree of polymerization obtained in a given preparation will be influenced by the amount of water present in the reaction mixture, and for products of high solution viscosities in water at 37% solids, by weight, based on the total weight of the cationic portion of the polyquaternary, it is essential that the amount of water present in the reaction mixture be limited, as indicated, to avoid premature termination of the growing polymer chain by cyclization and hydrolysis occasioned by excessive water usage. In preferred instances, the amount of water present will be in the range of about 15% to 45% water, by weight, based on the total weight of reactants and water. In addition to water as the reaction medium, there may be used a water soluble alcohol in place of part of the water contemplated. It is generally preferred to use water alone, however, from an economic viewpoint. Another factor in considering the reaction is the quantity and type of polyamine. As the functionality of the polyamine increases, the amount to be used thereof is decreased in order to avoid untoward gelation and to obtain the desired high molecular weight polymer.

The reaction of an epoxy type compound with secondary amine, such as dimethylamine, is exothermic, for example, the reaction of epichlorohydrin with dimethylamine is exothermic to the extent of about 40 kilocalories per mole of epichlorohydrin initially. Accordingly, some care should be exercised to control the temperature during preparation of the reaction mixture. Use of water, as described above, is helpful. In addition, the rate of addition of reactants should be such as to keep the temperature in the range of about 20°C. to about 70°C. when the two reactants specified are employed alone. The addition may be of secondary amine to epoxy type compound dispersed or dissolved in water, of secondary amine dissolved in water to epoxy type compound, of epoxy type compound to secondary amine dissolved in water, or any other suitable ramification of the additions recited.

After the reaction mixture has been obtained, the reaction should be allowed to proceed at a suitable temperature to prepare the polyquaternary backbone. In general, higher temperatures permit somewhat more rapid reaction, but the reaction of secondary amine and an epoxy type compound is quite rapid at about 50°C. and so temperatures from about 40°C. to 70°C. constitute a preferred practical range.

When producing polyquaternary backbones when both secondary amines and polyamines are present in the reaction mixture with epoxy type compounds, the same general procedures recited above are employed, except for three modifications that arise from the presence of polyamine. One modification is the use in some instances of additional amounts of epoxy type reactant due to the increased functionality of polyamine over secondary amines. A second modification is the use of a wider temperature range which also results from the increased functionality of polyamines. The third modification results from the use of two different amines and the added variations in addition of reactants that are possible. In general, the use of polyamine gives rise to the possibility of using amounts of epoxy type reactants that are preferably equimolar to the total molar amounts of amines employed, but in addition gives rise to the use in some instances of amounts of epoxy type reactant that are equivalent to the total functionalities of the amines employed. When use of epoxy type reactant substantially equal to the total equivalency of the amines is contemplated, additional precaution should be considered with respect to the reaction since loss of water dispersibility can occur rapidly at later stages of reaction. Temperatures in the range of about 20° to 100°C. are reached during formation of the reaction mixture and the use of a temperature in the range of about 50° to 100°C. is contemplated during later stages of the reaction. The use of two different amines coupled with the use of added epoxy type compound gives rise to an additional number of variations in the order of addition of reactants and the manner in which added epoxy type compound is employed.

There are in general two preferred variants employed in preparing the polyquaternary compounds. In a first preferred variant, the secondary amine and epoxy type reactant are first reacted to a substantial degree, i.e., from about 50% to about 80% of the reaction potential, in aqueous medium. In forming the reaction mixture, reactants may be added in either order and the temperature is maintained in the range of about 20°–100°C., preferably 20°–70°C. After the desired degree of reaction has been obtained, the polyamine is added and the reaction maintained in the range of about 50°–100°C. until a polyquaternary compound is obtained which as a 37% aqueous solution by weight based on the weight of the cationic portion of the polyquaternary compound, has a viscosity of 25°C. of at least 100 centistokes, preferably at least 200 centistokes.

In a second preferred variant, the secondary amine and polyamine are mixed and reacted with the epoxy type reactant in aqueous medium. Addition of reactants may be in any order and in preparing the reaction mixture, the temperature is maintained in the range of 20°–100°C. After the mixture is formed, it is held at a temperature in the range of 50°–100°C. until a viscosity as in the first variant is obtained.

In either of two variants just described, the total usage of epoxy type reactant may be added during preparation of the reaction mixture. A preferred procedure, however, is to add an amount of epoxy type reactant which is less than the total usage contemplated in preparing the reaction mixture and subsequently adding the additional epoxy type reactant in increments up to the level of usage contemplated. In this method of addition, each increment of epoxy type reactant is allowed to react prior to addition of further increments. This method of addition allows high viscosities to be achieved in a relatively safe manner.

While the range of viscosities, and hence molecular weights, of the compounds of the present invention are quite broad, nevertheless they are all of desirable molecular weight. For best performance efficiencies viscosities of 200 centistokes and more are highly desirable. There is essentially no significant upper limit on molecular weight except that the polyquaternaries must be water dispersible and preferably water soluble to an extent useful in applications without unduly high viscosity. Products having viscosities as high as 800 or 17,000 centistokes can be used. Increases in efficiency with rising molecular weight are at first quite large and grandually diminish as molecular weight increases.

The amount of a particular polymer which is to be used depends on the nature of the aqueous dispersion in which it is to be used. Relatively small amounts can be used for the flocculation of colloidal clays. The amounts of flocculants needed are very moderate and less than with prior art flocculants. The volume of aqueous dispersion treated can be so enormous as to require very large quantities of the polyquaternary compounds of the present invention. Aqueous dispersion, such as enzyme mashes, ilmenite digestion liquors, and paper making wastes, represent dispersions having a much higher content of the disperse phase, and the flocculation of such dispersions requires larger amounts of flocculant, but the increased efficiency of the products of the present invention as compared with currently used cationic flocculants still holds. For example, in paper wastes the disperse phase may be solid with quite large particle size, much larger than the fine suspension of solids in the case of certain mining operations.

In all of the examples which follow, the parts are by weight unless otherwise specified and the water is deionized water. Also, where solids or polymer solids are referred to, they are by weight, based on the weight of the cationic portion of the polyquaternary and not the total weight of the polymer including anion.

The polyquaternary compounds used in the examples were prepared by the following procedure with variations at the termination of the reaction to provide the specific values of solution viscosity indicated by specific polyquaternary compounds. The viscosities are determined by the Gardner-Holdt procedure.

POLYQUATERNARY PREPARATION

To a flask equipped with condenser, mechanical stirrer, thermometer, addition funnel, and pH electrodes were added 76.28 grams of deionized water and 92.53 grams of epichlorohydrin (1 mole) to give an emulsion on stirring. To the addition funnel were added 107.09 grams of 40% aqueous dimethylamine (42.84 grams real, 0.95 mole) and 3.0 grams of ethylenediamine. The amine solution was added to the epichlorohydrin emulsion over one hour, keeping the temperature between 20° and 31°C. After 30 minutes, the clear solution which resulted was heated to 50°C. for 1.5 hours.

The solution was then heated to 90°C. and 20 milliliters of 50% potassium carbonate (aqueous) solution were added. The viscosity of the solution was increased by incremental additions of epichlorohydrin. Initially, 5 milliliters of epichlorohydrin were added, followed by 2 ml. after 20 minutes, 1.5 ml. after an additional 15 minutes, 1.0 ml. after another 17 minutes, and finally 0.5 ml. after another 27 minutes. The product had a viscosity of 1000 centistokes at a concentration of 37%, by weight, based on the cationic portion of the polyquaternary compound, at 25°C.

In a similar manner, but by variations in the amounts of incremental additions of epichlorohydrin products of the various solution viscosities employed in the examples which follow were obtained.

EXAMPLE 1

In order to demonstrate the advantage of products of the present invention as filter aids in treating coal washings associated with processing bituminous coal, the following procedure was used:

To a 2-liter pail is added 1,500 cc. of the coal washings under test, which comprises the discharge from initially flocculated washings. The discharge from the initial flocculation produces washings containing from 5% to 25% solids, which solids consist of about 40% fine bituminous coal and about 60% non-combustible inorganic matter such as clay and various silicates. An anionic flocculant, a copolymer of 70% acrylamide and 30% acrylic acid is added as a 0.3% aqueous solution to provide 80 parts per million in the discharge under test. The discharge is then mixed from 1 minute to distribute the anionic flocculant therein and then filtered using a Dorr type 0.1 square foot filter leaf using a polypropylene cloth filter medium. Filtration time was for 35 seconds and drying of the cake was for 60 seconds. In conjunction with the filtration, the volume of filtrate was measured, as well as cake thickness and weight.

The above procedure was repeated except that after the anionic flocculant was mixed in the effluent under test, there was added in separate runs sufficient of a polyquaternary product of Example 2 of U.S. Pat. 3,738,945 as a 1% aqueous solution, by weight based on the total weight of the polymer, to provide 100 and 150 parts per million in the effluent under test. Stirring to mix the polyquaternary flocculant is for an additional 30 seconds.

The results of the various tests are as follows:

| Run No. | Anionic Flocculant ppm | Polyquaternary Flocculant ppm | Filtrate Volume cc. | Filter Cake Thickness in. | Wt. gms. |
|---|---|---|---|---|---|
| 1 | 80 | 0 | 105 | 1/8 | 31.4 |
| 2 | 80 | 100 | 165 | 5/16 | 58.6 |
| 3 | 80 | 150 | 208 | 1/4 | 63.5 |

The results indicate the beneficial effects obtained for use of the products of the present invention as filter aids, resulting in larger cake formation and greater filtrate volume in a specified time period as compared to the normal use of anionic flocculant alone.

EXAMPLE 2

This example illustrates the effectiveness of the products of the present invention as demulsifiers.

Using an American Petroleum Institute separator, an aqueous stream containing emulsified and suspended oil and suspended iron-containing solids was processed in the normal manner.

A similar trial was then made wherein prior to entry into the separator there was mixed sufficient of the polyquaternary product of Example 2 of U.S. Pat. No. 3,738,945 as a 1% aqueous solution to provide 5 parts per million in the stream being processed. Results of the run are as follows:

| Product of Example 2 ppm | pH | Influent Oils, ppm | Solids, ppm | Effluent Oils, ppm | Solids, ppm |
|---|---|---|---|---|---|
| 0 | 4.3 | 560 | 427 | 540 | 427 |
| 5 | 4.2 | 271 | 1291 | 112 | 50 |
| 5 | 6.2 | 61 | 538 | 2 | 35 |
| 5 | 8.2 | 88 | 650 | 15 | 45 |

In the above table, influent represents the stream prior to entering the separator and effluent represents the stream after exit from the separator. The results indicate the beneficial results in separation obtained with the product of the present invention. The results also show that the product of the present invention is beneficial at a wide range of pH values.

EXAMPLE 3

This example illustrates the effectiveness of the polymers of the present invention in treating waste waters from a paper-making plant.

In carrying out the evaluation of a flocculant in treating such waste waters, an effective amount of flocculant is added to the waste water to settle the suspended solids. The settled solids are separated by centrifugation and the quantity of filtrate obtained is measured.

In a laboratory experiment, 0.2 grams of flocculant on a real basis was added to 100 milliliters of suspension. The mixture was stirred to obtain uniformity and then a 15 milliliter aliquot was placed in a centrifuge tube. Centrifugation was carried out at full speed for about 6 minutes after which time the volume of supernatant liquor was measured. As a control, a suspension containing no flocculant was evaluated and the volume of supernatant liquor was 0.1 to 0.2 milliliters. Using polyquaternary compounds of the present invention, three runs were made using compounds of varying solution viscosities. Results are as follows:

| Run | Solution Viscosity (Cps) | Supernatant Volume (ml) |
|---|---|---|
| Comparative | — | 0.1–0.2 |
| 1 | 360 | 7.25 |
| 2 | 2000 | 8.00 |
| 3 | 4600 | 8.60 |

The results show that polyquaternaries used in the present process provide a high degree of sedimentation and are effective at a wide range of solution viscosities.

We claim:

1. A process for flocculating flocculatable industrial wastes which are in the form of aqueous dispersions having negative charges which process comprises adding to the dispersion an effective amount of a water-dispersible polyquaternary polymer comprising the reaction product of dimethylamine, a polyfunctional amine, and a difunctional epoxy compound selected from the group consisting of epihalohydrins and precursors for epihalohydrins which under alkaline conditions are readily converted into the corresponding epoxy compounds, and mixtures thereof, said polyquaternary polymer containing repeating units of the structures

$\{E\}$ and $\{A\}$ as the cationic portion, and $X^-$ as the anionic portion wherein R and $R_2$ are each methyl; E is the residue obtained from said epoxy compound; A is a residue obtained after at least difunctional epoxy reaction from a polyfunctional amine selected from the group consisting of ethylenediamine and polyethylenepolyamines of the structure

wherein y represents an integer of about 1 to 5; $X^-$ is an anion forming the anionic portion of said polyquaternary compound; the amount of said polyfunctional amine being up to about 15 mole percent of the total moles of said dimethylamine and said polyfunctional amine, the amount of said E being from at least that amount which is equimolar to the molar quantities of said amines up to the full functional equivalency of said amines, so as to provide a polyquaternary compound which as a 37% aqueous solution based on the cationic portion of said polyquaternary compound has a viscosity of at least 100 centistokes; and the amount of said anion present is such as to satisfy anion requirements of the cationic portion of said polyquaternary compound.

2. The process of claim 1 wherein the viscosity of said polyquaternary compound is at least 200 centistokes.

3. The process of claim 1 wherein the flocculatable industrial waste is an iron ore slime.

4. The process of claim 1 wherein the flocculatable industrial waste is a coal washing.

5. The process of claim 1 wherein the flocculatable industrial waste contains emulsified and suspended oil and suspended iron-containing solids.

6. The process of claim 1 wherein the flocculatable industrial waste is a waste water from a paper-making plant.

* * * * *